United States Patent Office 3,554,922
Patented Jan. 12, 1971

3,554,922
OCTADECYLAMINE SUSPENSIONS
Roland Berner, Tinley Park, Ill., assignor to Nalco Chemical Company, Chicago, Ill., a corporation of Delaware
No Drawing. Filed Sept. 3, 1968, Ser. No. 757,151
Int. Cl. C09k *3/00;* C23f *11/00*
U.S. Cl. 252—392   6 Claims

ABSTRACT OF THE DISCLOSURE

Stable octadecylamine suspensions are prepared by combining the amine with a vegetable polysaccharide gum.

BACKGROUND OF THE INVENTION

Field of the invention

This invention is in the field of providing film-forming amine compositions to provide a stable concentrate which can be injected into water or steam systems for the prevention of corrosion.

The prior art

The so-called filming amines, usually thought of as those amines which contain 12 to 20 carbon atoms per molecule have been suggested as corrosion inhibiting compounds particularly in aqueous transporting systems such as steam boilers, condensate lines, transfer systems, evaporators and other circulating water systems. Commercially, the most prevalent compound used for this purpose is octadecylamine which suffers from the disadvantage that its solubility in water is quite limited so that it is difficult to inject the compound quantitatively into aqueous systems.

An early disclosure of the use of such amines in corrosion inhibition will be found in U.S. Pat. No. 2,460,259 issued to Kahler. A further modification to this system is described in U.S. Pat. No. 2,712,531 issued to Maguire which describes corrosion inhibiting compositions and methods involving a combination of octadecylamine and its acetate.

Dispersion of octadecylamine by means of non-ionic surface active agents containing repeating oxyalkylene groups is described in U.S. Pat. No. 2,882,171 to Denman. Another corrosion inhibiting system employing octadecylamine is described in Denman Pat. No. 2,956,889 which suggests the use of a combination of the amine with a water soluble condensate of at least five mols of ethylene oxide with an aliphatic amine.

Such prior systems are not entirely satisfactory for preparing octadecylamine compositions. Where the acetate is used, there is a tendency for the acetate to dissociate at the point of injection, forming acetic acid which tends to corrode metal fittings. The use of surface active agents in combination with octadecylamine significantly raises the cost of the composition.

SUMMARY OF THE INVENTION

The stable corrosion inhibiting composition of the present invention includes a dispersion of octadecylamine and a vegetable polysaccharide gum in water, the weight ratio of octadecylamine to gum being in the range from about 4 to 1 and 60 to 1 and preferably from 25 to 1 to 35 to 1. The particularly preferred gum for this use is guar gum which has the capacity of reducing the viscosity of octadecylamine dispersions, and stabilizing feed solutions of octadecylamine concentrates through a temperature range of 200° F. down to 50° F. The mixture requires only initial agitation for dispersion and is infinitely dilutable with water.

DESCRIPTION OF THE PREFERRED EMBODIMENTS

The present invention makes use of a wide variety of gums, particularly the hydrophilic gums of vegetable origin derived from plant polysaccharides. The following table lists the industrially important gums which can be employed with the present invention, together with the plant source, the sugar units, and the most prevalent glycosidic linkage present:

| Gum | Source | Sugars present and linkages |
|---|---|---|
| Seaweeds: | | |
| Agar | Red algae | D-galactose $\beta$-(1→4), 3, 6-anhydro-L-galactose$\alpha$(1→3), +sulfate acid ester groups. |
| Algin | Brown algae (*Macrocystis pyrifera*) | D-mannuronic acid. $\beta$-(1→4), L-guluronic acid $\beta$-(1→4), Na salt. |
| Carrageenin | Red algae (*Chondrus-crispus*) (*Gigarlina stellata*). | D-galactose, 3,6-anhydro-D-galacrose+sulfate acid ester groups. |
| Fucoidan | Brown algae (*Fucus* sp., *Laminaria* sp.). | L-fucose+sulfate acid ester groups. |
| Laminaran | Brown algae (*Laminaria* sp.) | D-glucose, D-mannitol, $\beta$-(1→3) chain and $\beta$-(1→6) branches |
| Plant exudates: | | |
| Gum arabic | *Acacia sp.* | L-arabinose, D-galactose, L-rhamnose D-glycuronic acid. |
| Ghatti | *Anogeissus latifolia* | L-arabinose, D-xylose, D-galacrose, D-mannose, D-glucuronic acid. |
| Karaya | *Sterculia urens* | D-galactose, L-rhamnose, D-galacturonic acid. |
| Tragacenth | *Astragalus* sp. | D-galactose, D-xylose, D-glucuronic acid. |
| Plant extracts: | | |
| Pectin | Cell walls and intracellular spaces of all plants. | D-galacturonic acid $\alpha$-(1→4), partially esterfied, L-arabinose $\alpha$-(1→5) and $\alpha$-(1→3) branches, D-galacrose $\beta$-(1→4). |
| Larch arabinogalactan | Western larch | D-galactose, L-arabinose. |
| Ti | Rubbers of Cordyline terminalis | D-fructose, D-glucose. |
| Plant seeds: | | |
| Corn-hull gum | Corn seed-coat | D-xylose, L-arabinose, D-galactose, L-galactose, D-glucuronic acid. |
| Guar | Camposia terogonolobus endosperm | D-mannose $\beta$-(1→4), D-galactose $\alpha$(1→6) branches. |
| Locust bean | Carob tree (*Ceratonia siliqua*) endosperm. | D-mannose $\beta$-(1→4), D-galactose $\alpha$(1→6) branches. |
| Quince seed | *Cydonia vulgaris* | L-arabinose, D-xylose, hexuronic acid, monomethyl hexuronic acid. |
| Psyllium seed | *Plantago* sp | D-xylose, L-arabinose, D-galacturonic acid, L-rhamnose, D-galactose. |
| Flax seed | *Linum usilatissimum* | D-galacturonic acid, xylose L-rhamnose, L-arabinose, L-galactose, D-glucose. |
| Tamarind | *Tamarindus indica* | D-glucose, D-galactose, D-xylose. |
| Wheat gum | Wheat | D-xylose $\beta$-(1→4), L-arabinose branches. |
| Miscellaneous: | | |
| Cellulose derivatives | Plant cell walls, wood pulp and cotton | D-glucose $\beta$-(1→4). |
| Starch | Cereal grains and tubers | D-glucose $\alpha$(1→4), D-glucose $\alpha$(1→4), $\alpha$(1→6) at branch) points. |
| Dextran | Bacterial action on sucrose | D-glucose $\alpha$-(1→6) and $\alpha$-(1→3). |
| Chitin | Exoskeleton of animals of the phylum Arthropoda. | N-acetyl D-glucosamine $\beta$-(1→4). |

The best results are obtained when a gum is chosen such that it has a viscosity in a 1% concentration of from 20 to 2000 centipoises at 25° C., measured with a Brookfield viscosimeter at 20 r.p.m.

The broad ratio of octadecylamine to gum in the concentrate is in the range from about 4 to 1 to 60 to 1, with a range of 25 to 1 to 35 to 1 being preferred. The combination of the octadecylamine and gum, in most concentrates will range from about 1 to 25% by weight of the concentrate, although it should be realized that for some purposes more concentrated or less concentrated compositions might be desirable. The concentrated suspensions are readily dilutable with water to produce extremely small concentrations of the amine.

There are many guar gums and derivatives of guar gums available commercially. For example, there is a guar gum with cationic activity ("Jaguar Plus") which is soluble in both hot and cold water, and has a viscosity at a 1% concentration of about 100 cps. The solution pH of this material ranges from about 5.0 to 7.0. There are also non-ionic guar gums which have the ability to produce extremely high viscosities at low concentrations. In addition to the guar gums, very good results are obtained through the use of locust bean gums.

The following specific examples illustrate the method involved in producing the dispersion and the results achieved, and these are being submitted as purely illustrative.

EXAMPLE I

Distilled water in an amount of 84.5 parts by weight was heated to 160° F., and 0.5 part of gum guar was added slowly with stirring to form a sol. Octadecylamine in the amount of 15 parts was melted and heated to 180° F. The sol was added slowly to the 180° F. molten octadecylamine with vigorous agitation. This formed a white, creamy product, which on cooling had the consistency of cold cream.

From this product, stable feed solutions were made by diluting with hot water at 180° F., and agitating until the ambient temperature was reached. No additional agitation was required thereafter.

The following specific dispersions were made, and each resulted in a composition having very good stability.

| Percent product in water | Percent octadecylamine | Percent guar gum |
|---|---|---|
| 10 | 1.5 | 0.050 |
| 5 | 0.75 | 0.025 |
| 4 | 0.60 | 0.020 |
| 2 | 0.30 | 0.010 |
| 1 | 0.15 | 0.005 |

EXAMPLE II

A stable paste product was prepared as in Example I by combining 15.2% by weight of octadecylamine with 0.8% of locust bean gum, and 84.0% distilled water. This paste could be diluted to 4%, 2% and 1% solutions and evidenced only a slight separation on cooling.

Dispersions evidencing good stability were also prepared using the technique described above from other types of gums including "Cationic Gum XG 158" marketed by General Mills, locust bean gum and from the gum known as "Burtonite" marketed by the Burtonite Co., of Nutley, N.J.

From the foregoing, it will be understood that the compositions of the present invention provide an improved dispersion of octadecylamine and water which is stable to standing and storage, and which uses relatively inexpensive materials.

It should also be evident that various modifications can be made to the described embodiments without departing from the scope of the present invention.

I claim as my invention:

1. A stable corrosion inhibiting composition consisting essentially of a dispersion of octadecylamine and a vegetable polysaccharide gum in water, the weight ratio of octadecylamine to gum being in the range from 4 to 1 to 60 to 1.

2. The composition of claim 1 in which said gum is a guar gum.

3. The composition of claim 1 in which said gum has a viscosity in 1% concentration of 20 to 2000 centipoises at 25° C.

4. The composition of claim 1 in which the weight ratio of octadecylamine to gum is in the range from 25 to 1 to 35 to 1.

5. The composition of claim 1 in which the combination of octadecylamine and gum constitutes from 1 to 25% by weight of said composition.

6. The composition of claim 1 in which said gum is a locust bean gum.

References Cited

UNITED STATES PATENTS

| 2,956,889 | 10/1960 | Denman | 252—392 |
| 3,088,796 | 5/1963 | Kahler et al. | 252—392 |
| 3,239,470 | 3/1966 | Michal | 252—392 |
| 3,418,253 | 12/1968 | Silverstein et al. | 252—392 |
| 3,418,254 | 12/1968 | Bishof et al. | 252—392 |
| 3,444,090 | 5/1969 | Michal | 252—392 |

RICHARD D. LOVERING, Primary Examiner

I. GLUCK, Assistant Examiner